United States Patent
Hsu (10) Patent No.: US 11,828,976 B2
(45) Date of Patent: Nov. 28, 2023

(54) BACKLIGHT MODULE AND DISPLAY DEVICE USING THE SAME

(71) Applicant: AU Optronics Corporation, Hsin-Chu (TW)

(72) Inventor: Ming-Chun Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 155 days.

(21) Appl. No.: 17/514,285

(22) Filed: Oct. 29, 2021

(65) Prior Publication Data

US 2022/0206211 A1    Jun. 30, 2022

(30) Foreign Application Priority Data

Dec. 31, 2020   (TW) ................... 109147223

(51) Int. Cl.
   *F21V 8/00*   (2006.01)
(52) U.S. Cl.
   CPC ......... *G02B 6/0093* (2013.01); *G02B 6/0051* (2013.01); *G02B 6/0073* (2013.01)
(58) Field of Classification Search
   CPC ... G02B 6/0093; G02B 6/0051; G02B 6/0073
   See application file for complete search history.

(56) References Cited

U.S. PATENT DOCUMENTS

| | | | |
|---|---|---|---|
| 9,904,105 B2 | 2/2018 | Ma et al. | |
| 9,982,849 B2 * | 5/2018 | Park | G02F 1/133603 |
| 10,613,383 B2 * | 4/2020 | Kim | G02F 1/133603 |
| 2011/0050556 A1 | 3/2011 | Bae et al. | |
| 2011/0050735 A1 | 3/2011 | Bae et al. | |
| 2011/0051397 A1 * | 3/2011 | Bae | G02B 6/0021 362/235 |
| 2019/0333791 A1 * | 10/2019 | Hussell | H01L 21/67144 |
| 2021/0397049 A1 * | 12/2021 | Allen | G02F 1/133524 |
| 2022/0137280 A1 | 5/2022 | Lai et al. | |

FOREIGN PATENT DOCUMENTS

| | | |
|---|---|---|
| CN | 102483538 A | 5/2012 |
| CN | 103383084 A | 11/2013 |
| CN | 114447196 A | 5/2022 |
| TW | I710809 B | 11/2020 |

* cited by examiner

*Primary Examiner* — Mary Ellen Bowman
(74) *Attorney, Agent, or Firm* — WPAT, P.C.

(57) ABSTRACT

The present disclosure provides a backlight module, including a substrate, a plurality of light-emitting elements, a protective layer and a plurality of first dots. These light-emitting elements are disposed on the substrate. The protective layer is disposed on the substrate and the light-emitting elements, the protective layer has an upper surface and a lower surface opposite to the upper surface, and the upper surface of the protective layer is flat. The first dots are disposed on the upper surface of the protective layer and cover the light-emitting elements. A vertical projection area of each of the first dots on the substrate is larger than a vertical projection area of each of the light-emitting elements on the substrate, so as to reduce the thickness of the backlight module and reduce the dots alignment process.

18 Claims, 10 Drawing Sheets

BACKLIGHT MODULE AND DISPLAY DEVICE USING THE SAME

CROSS-REFERENCE TO RELATED APPLICATION

This application claims priority to Taiwan Application Serial Number 109147223, filed on Dec. 31, 2020, which is herein incorporated by reference in its entirety.

BACKGROUND

Field of Invention

The present invention relates to a backlight module and a display device.

Description of Related Art

Generally, most of the light-emitting element of the direct-type backlight module is light emission diode (LED). Since the light intensity directly above the LED is the strongest, dots are currently printed on the diffuser plate to reduce the light intensity directly above the LED, and to achieve the uniform brightness of the screen.

With the demand for thinner and lighter products, the thickness of each component is hoped to be as thin as possible. Since the dots need to be printed on the diffuser plate currently, the thickness of the backlight module remains high. Furthermore, the diffuser plate printed with dots must be precisely aligned with the LEDs during assembly, in order to shield the light intensity directly above the LEDs. As long as the alignment is slightly deviated, uneven brightness and darkness will easily occur. In addition, the protective glue covering the LEDs is required to be thinned for thinner and lighter products. However, the thinner the protective glue is, the more difficult it is to control the consistency of the thickness, resulting in uneven distribution of light and dark from the light board. Therefore, the related art really needs to be improved.

SUMMARY

To solve the above-mentioned problems of excessive thickness of the backlight module and cumbersome dot alignment process, the present disclosure provides a technical solution to directly print the dots on the protective layer of the light board. Indirectly, the thickness of the protective glue can be retained by omitting the diffuser plate for the printing dots, so as to avoid inconsistent glue thickness because of reducing the protective glue, and also to improve the uneven distribution of light and dark on the screen.

The present disclosure provides a backlight module comprising a substrate, a plurality of light-emitting elements, a protective layer, and a plurality of first dots. The plurality of light-emitting elements is disposed on the substrate. The protective layer is disposed on the substrate and the plurality of light-emitting elements, and the protective layer has an upper surface and a lower surface opposite to the upper surface, wherein the upper surface is a flat surface. The plurality of first dots is disposed on the upper surface of the protective layer and respectively covers the plurality of light-emitting elements, wherein a vertical projection area of each one of the first dots on the substrate is larger than a vertical projection area of each one of the light-emitting elements on the substrate.

In some embodiments, the plurality of light-emitting elements are light emission diodes formed on a wafer, and the plurality of light-emitting elements are implanted on the substrate through mass transfer.

In some embodiments, the plurality of light-emitting elements are blue light emission diodes.

In some embodiments, each of the plurality of light-emitting elements is a Mini LED chip directly packaged on the substrate to form a light board structure, which belongs to a direct-type backlight module.

In some embodiments, a color of each one of the plurality of first dots is white.

In some embodiments, backlight module further comprises a plurality of second dots disposed on the protective layer, wherein a size of each one of the second dots is smaller than that of each one of the first dots.

In some embodiments, between adjacent two of the first dots, the plurality of second dots are arranged from large to small along a direction away from each one of the adjacent two of the plurality of first dots.

In some embodiments, a size of each one of the plurality of second dots is the same.

In some embodiments, the plurality of second dots are arranged at equal distances between the adjacent two of the plurality of first dots.

In some embodiments, a color of each one of the plurality of second dots is white.

In some embodiments, a form of each one of the first dots and a form of each one of the second dots in a cross-section view show that a center of each one of the first and second dots is higher than two sides of each one of the first and second dots, and a shape of each one of the first and second dots is curved.

In some embodiments, the substrate is defined a display area and a peripheral area surrounding the display area; the plurality of light-emitting elements are blue light emission diodes; and the backlight module further comprises a plurality of third dots located at the display area, and a material of each one of the plurality of third dots is white reflective material doped with yellow phosphor.

In some embodiments, a ratio of a length of the peripheral area to a length of the display area and the length of the peripheral area is from 1% to 4.5%.

In some embodiments, backlight module further comprises a blue light transmit film disposed on the protective layer and the plurality of first dots; and a color conversion film disposed on the blue light transmit film.

In some embodiments, backlight module further comprises a diffuser plate disposed on the color conversion film; and an optical brightener film disposed on the diffuser plate.

In some embodiments, the protective layer is a transparent gel.

In some embodiments, the upper surface of the protective layer is a reflection surface, refraction surface, or a combination thereof.

In some embodiments, a thickness from each one of the plurality of light-emitting elements to the upper surface of the protective layer is from 100 µm to 400 µm.

The present disclosure also provides a display device, comprising a backlight module as above mentioned, a display panel, and a frame body. The display panel disposed on the backlight module, and the backlight module and the display panel disposed in the frame body.

In some embodiments, the frame body has a plastic frame, and the display panel is disposed on the plastic frame.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. The invention can be more fully understood by reading the following detailed description of the embodiment, with reference made to the accompanying drawings as follows.

DETAILED DESCRIPTION

In the accompanying drawings, thicknesses of layers, films, panels, regions and so on are exaggerated for clarity. Throughout the specification, the same reference numerals in the accompanying drawings denote the same elements. It should be understood that when an element such as a layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, the term "connected" may refer to physically connected and/or electrically connected (or coupled). Therefore, the electrical connection (or coupling) between two devices may include intervening elements existing between the two devices.

The terms used herein such as "about", "approximate", or "substantial" include a related value and an average within an acceptable deviation range of specific values determined by those with ordinary skills in the art with consideration of discussed measurement and a specific number of errors related to the measurement (i.e., a limitation of a measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about", "approximately", or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the invention and will not be interpreted in an idealized or overly formal sense unless expressly so defined herein.

Figure 1:
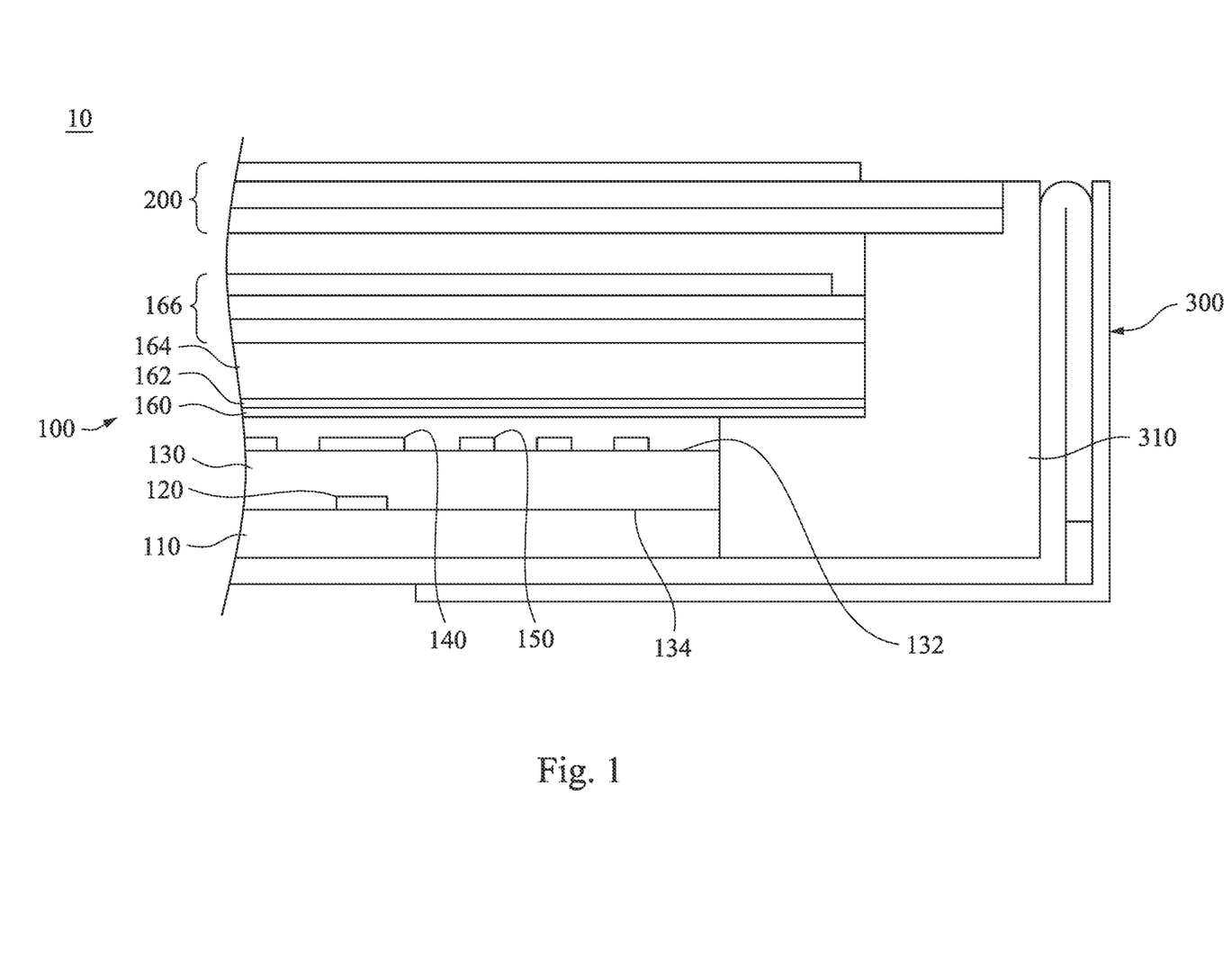
FIG. 1 is a cross-sectional view of a backlight module according to one embodiment of the present disclosure.

Please refer to FIG. 1, FIG. 1 is a cross-sectional view of a backlight module according to one embodiment of the present disclosure. The display device 10 includes a backlight module 100, a display panel 200, and a frame body 300, in which the display panel 200 is located above the backlight module 100, and the backlight module 100 and the display panel 200 are fixed in the frame body 300.

In some examples, the display panel 200 may be liquid display panel including: a transmissive display panel, a trans-reflective display panel, a reflective display panel, a double-sided display panel, a vertical alignment (VA) display panel, an in plane switch (IPS) display panel, a multi-domain vertical alignment (MVA) display panel, a twist nematic (TN) display panel, a super twist nematic (STN) display panel, a patterned-silt vertical alignment (PVA) display panel, a super patterned-silt vertical alignment (S-PVA) display panel, an advance super view (ASV) display panel, a fringe field switching (FFS) display panel, a continuous pinwheel alignment (CPA) display panel, an axially symmetric aligned micro-cell mode (ASM) display panel, an optical compensation banded (OCB) display panel, a super in plane switching (S-IPS) display panel, an advanced super in plane switching (AS-IPS) display panel, an ultra-fringe field switching (UFFS) display panel, a polymer stabilized alignment (PSA) display panel, a dual-view display panel (dual-view), a triple-view display panels (triple-view), or other types of display panels or combinations thereof. In some examples, the display panel 200 and the backlight module 100 can be bonded by optical clear adhesive.

In some examples, the material of the frame body 300 includes plastic (e.g. thermosetting material, thermoplastic, or combinations thereof), metal (e.g. aluminum, magnesium, copper, iron, tin, zinc, others, or combinations thereof, alloy (e.g. aluminum, magnesium, copper, iron, tin, zinc, oxides, nitrides, nitrogen oxides, or other compounds, or combinations thereof), or combinations thereof. The frame body 300 has a receiving space to receive the backlight module 100, the frame body 300 has a plastic frame 310, and the display panel 200 is disposed on the plastic frame 310.

One embodiment of the present disclosure provides the backlight module 100, including a substrate 110, a plurality of light-emitting elements 120, a protective layer 130, a plurality of first dots 140, and a plurality of second dots 150.

The substrate 110 may include any suitable substrate. In some embodiments, the substrate 110 may be a transparent substrate or an opaque substrate. In some embodiments, the substrate 110 may be a flexible substrate. Therefore, the light-emitting module structure 100 may be applied to a light-emitting module of a highly-curved back light form. In other embodiments, the substrate 110 may be a rigid substrate. For example, the substrate 110 may be but not limited to a printed circuit board.

The light-emitting element 120 is disposed on the substrate 110. In some examples, light-emitting element 120 may be light-emitting diode chip of any light-emitting wavelengths. For example, the light-emitting element 120 is a blue light-emitting diode chip or an ultraviolet light-emitting diode chip. The light-emitting element 120 may be light-emitting diode chip of any size. Such as, in some examples, the light-emitting element 120 may be, but not limited to a light-emitting diode chip, including mini light-emitting diode chip (Mini LED chip) or micro light-emitting diode chip (Micro LED chip). The size of "Mini LED chip"

may be about 50 μm to about 800 μm, for example, 100 μm, 200 μm, 400 μm, 600 μm, or any value between any two of these values. In addition, in some examples, the light-emitting element 120 may be light-emitting diode package (LED package) or chip scale package LED (CSP LED). In particular, the light-emitting element 120 is a Mini LED chip directly packaged on the substrate 110 (chip on board, COB) to form a light board structure, which belongs to a direct-type backlight module.

The protective layer 130 is disposed on the substrate 110 and the plurality of light-emitting elements 120, and the protective layer 130 has an upper surface 132 and a lower surface 134 opposite to the upper surface 132, in which the upper surface 132 is a flat surface. In some examples, the protective layer 130 is a transparent gel. For example, the protective layer 130 includes, but not limited to silicone, epoxy, or a combination thereof. In some embodiments, the upper surface 132 of the protective layer 130 is a reflection surface and/or refraction surface. The upper surface 132 of the protective layer 130 may reflect and/or refract lights emitted from the light-emitting element 120. In some examples, a thickness of the protective layer 130 is about 200 μm to about 800 μm, such as 300 μm, 400 μm, 500 μm, 600 μm, 700 μm, or any value between any two of these values.

Figure 2:
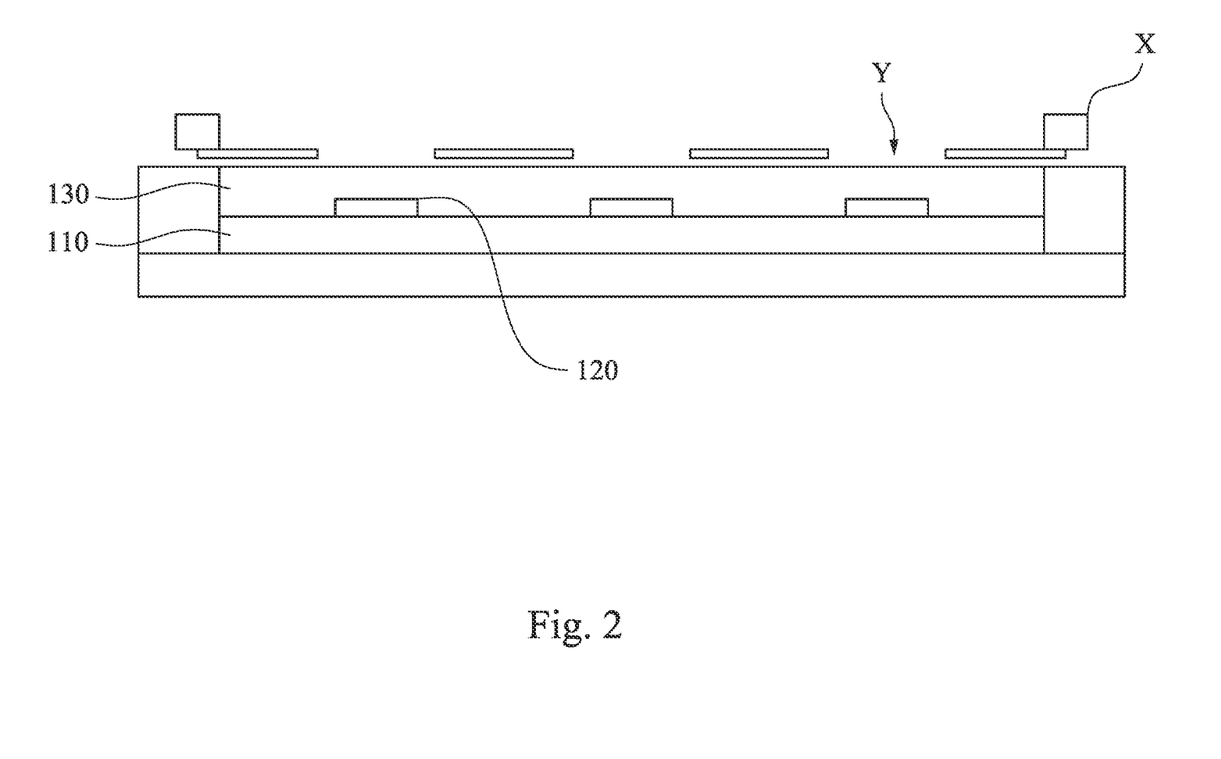
FIGS. 2 and 3 are cross-sectional views of each process stage of preparing dots on a protective layer with a grid frame according to one embodiment of the present disclosure.
Figure 3:
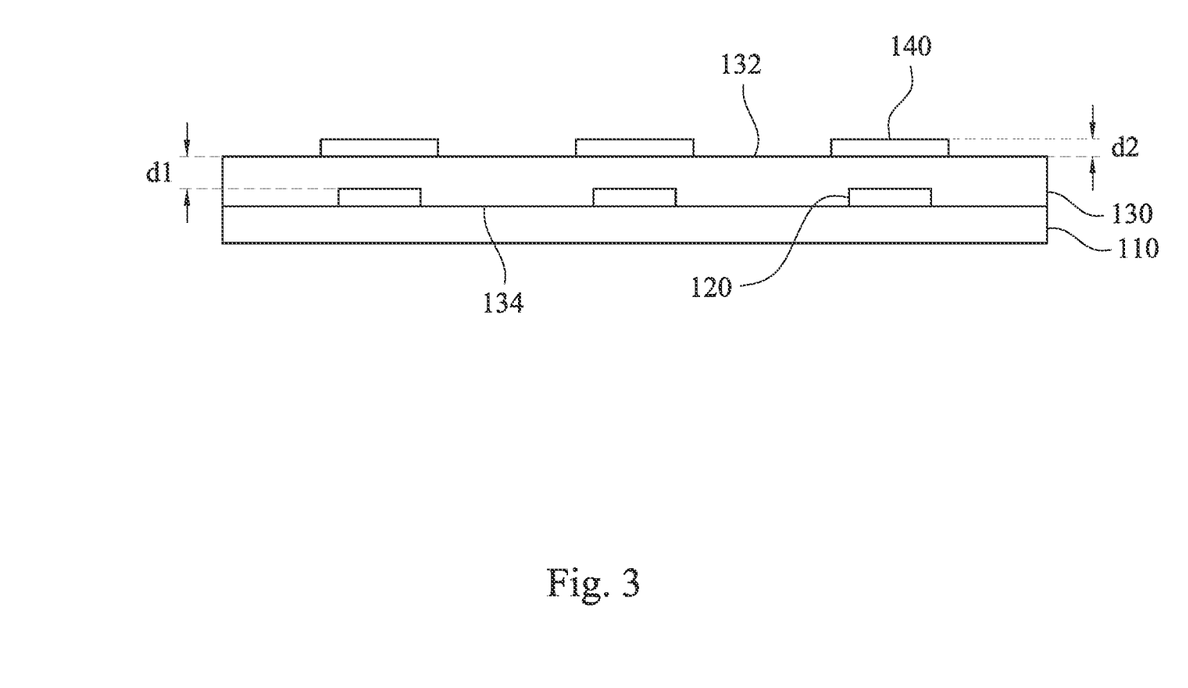

The plurality of first dots 140 are disposed on the upper surface 132 of the protective layer 130. Specifically, please refer to FIGS. 2 and 3 at the same time, FIGS. 2 and 3 are cross-sectional views of each process stage of preparing dots on a protective layer 130 with a grid frame X according to one embodiment of the present disclosure. In some examples, a thickness d1 from the light-emitting element 120 to the upper surface 132 of the protective layer 130 is from about 100 μm to about 400 μm, such as 150 μm, 200 μm, 250 μm, 300 μm, 350 μm, or any value between any two of these values. The grid frame X used for printing dots has a plurality of through holes Y to form a specific pattern. The grid frame X is disposed on the light board (having the substrate 110, the light-emitting elements 120, and the protective layer 130). After aligning the light-emitting elements 120 with the through holes Y, the first dots 140 are printed on the protective layer 130 through the through holes Y, so that the first dots 140 cover the light-emitting elements 120. In some examples, a color of the first dot 140 is white, and its material includes, but is not limited to silicon dioxide (SiO$_2$), titanium dioxide (TiO$_2$), aluminum oxide (Al$_2$O$_3$), calcium carbonate (CaCO$_3$), barium sulfate (BaSO$_4$), or a combination thereof, so that the light emitted from the light-emitting elements 120 can be reflected or refracted. In some examples, the reflectivity of the first dot 140 ranges from 70% to 95%. In some examples, a thickness d2 of the first dot 140 ranges from about 5 μm to about 40 μm, such as about 10 μm, about 15 μm, about 20 μm, about 25 μm, about 30 μm, about 35 μm, or any value between any two of these values.

Figure 4:
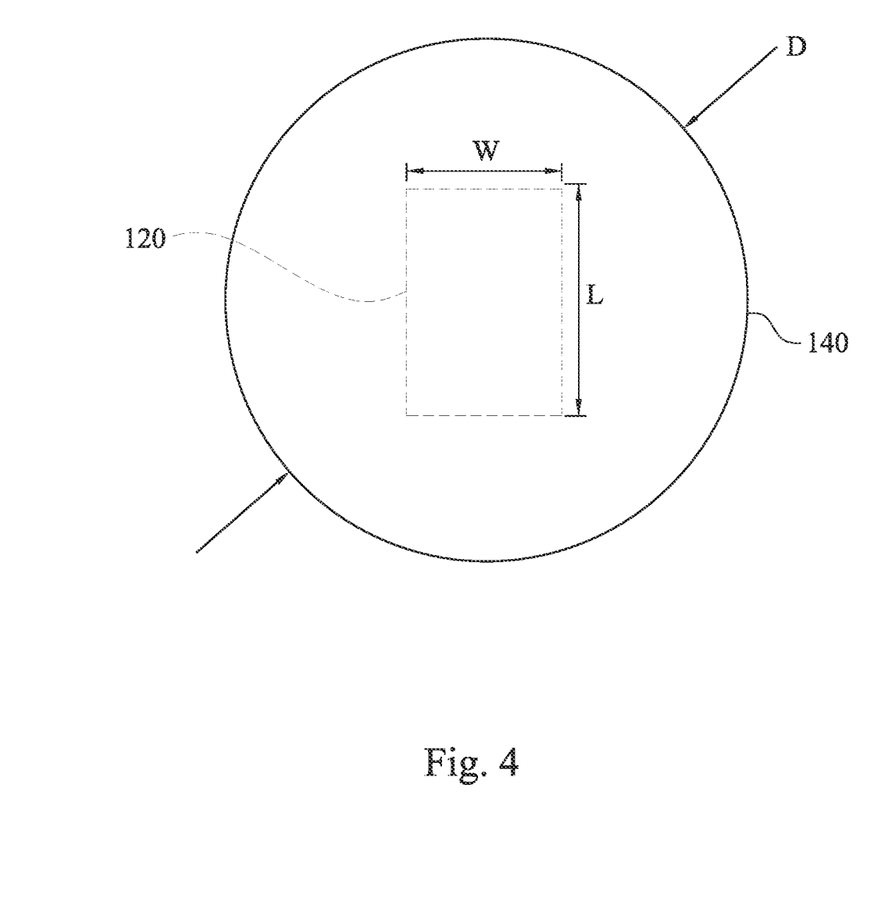
FIG. 4 is a top view of first dots and light-emitting elements according to one embodiment of the present disclosure.

Please refer to FIGS. 3 and 4 at the same time, FIG. 4 is a top view of the first dots 140 and the light-emitting elements 120 according to one embodiment of the present disclosure. A vertical projection area of each one of the first dots 140 on the substrate 110 is larger than a vertical projection area of each one of the light-emitting elements 120 on the substrate 110. In some examples, the shape of the first dot 140 includes, but is not limited to circle or polygon. In some examples, the light-emitting element 120 has a length L, a width W, and the shape of the first dot 140 is circle having a diameter D, in which a maximum value of the diameter D (Dmax) satisfies the following formula:

$$Dmax = \max(L, W) + \frac{d1}{0.15},$$

in which a minimum value of the diameter D (Dmin) satisfies the following formula:

$$Dmin = \max(L, W) + \frac{d1}{0.35},$$

wherein max (L,W) refers to the largest value of the length L or the width W, d1 refers to the thickness d1 from the light-emitting element 120 to the upper surface 132 of the protective layer 130. In some examples, the diameter D of the first dot 140 is about 200 μm to about 2000 μm.

Figure 5:
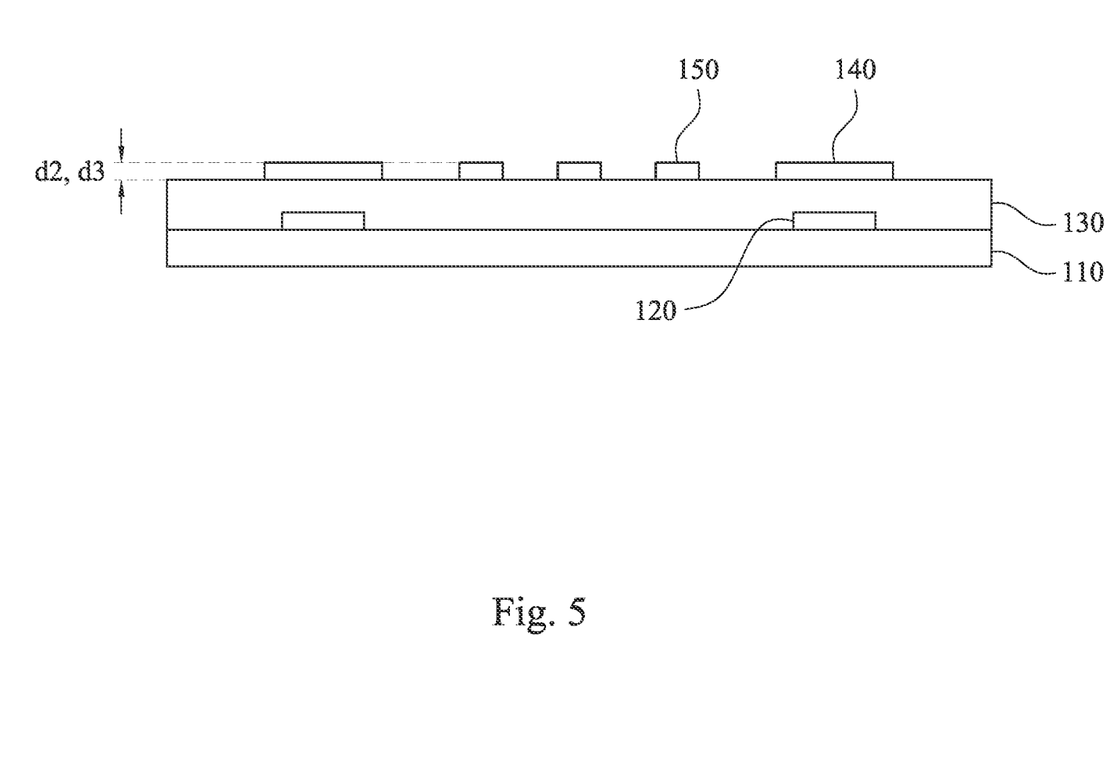
FIGS. 5 to 7 are partial cross-sectional views of backlight module according to different embodiments of the present disclosure.

Please refer to FIG. 5, FIG. 5 is partial cross-sectional views of backlight module according to another embodiment of the present disclosure. The second dots 150 are disposed on the protective layer 130, and disposed between the two adjacent first dots 140. In some examples, a portion of the second dots 150 are disposed to surround the first dot 140. In some examples, a vertical projection area of the second dot 150 on the substrate 110 and a vertical projection area of the light-emitting element 120 on the substrate 110 is not overlap. In some examples, the second dots 150 and the first dots 140 are coplanar. In some examples, a color of the second dot 150 is white, and its material includes, but is not limited to silicon dioxide (SiO$_2$), titanium dioxide (TiO$_2$), aluminum oxide (Al$_2$O$_3$), calcium carbonate (CaCO$_3$), barium sulfate (BaSO$_4$), or a combination thereof, so that the light emitted from the light-emitting elements 120 can be reflected or refracted. The size of the second dot 150 is smaller than that of the first dot 140, and the travel distance of the light in the protective layer 130 is increase to improve the uniformity of the light source on the screen.

In some examples, the shape of the second dot 150 includes, but is not limited to circle or polygon. In some examples, the diameter of the second dot 150 is about 50 μm to about 300 μm, such as about 60 μm, about 70 μm, about 80 μm, about 90 μm, about 100 μm, about 150 μm, about 200 μm, about 250 μm, or any value between any two of these values. In some examples, the thickness d3 of the second dot 150 ranges from about 5 μm to about 40 μm, such as about 10 μm, about 15 μm, about 20 μm, about 25 μm, about 30 μm, about 35 μm, or any value between any two of these values. Specifically, the second dot 150 and the first dot 140 can be printed on the protective layer 130 by the through holes Y of the grid frame X at the same time. Therefore, the material and the thickness of the second dot 150 and the first dot 140 can be the same or different.

In some examples, the second dots 150 have the same size between two adjacent first dots 140. Specifically, the same size of the second dots 150 are arranged at equal distances between two adjacent first dots 140, to maintain the brightness of the light and increase the uniformity of the light. In another example, please refer to FIG. 6, between adjacent two of the first dots 140, the second dots 150 are arranged from large to small along a direction away from the first dot 140. Specifically, the second dots 150 are located between two adjacent first dots 140 and arranged from large to small to large.

Figure 6:
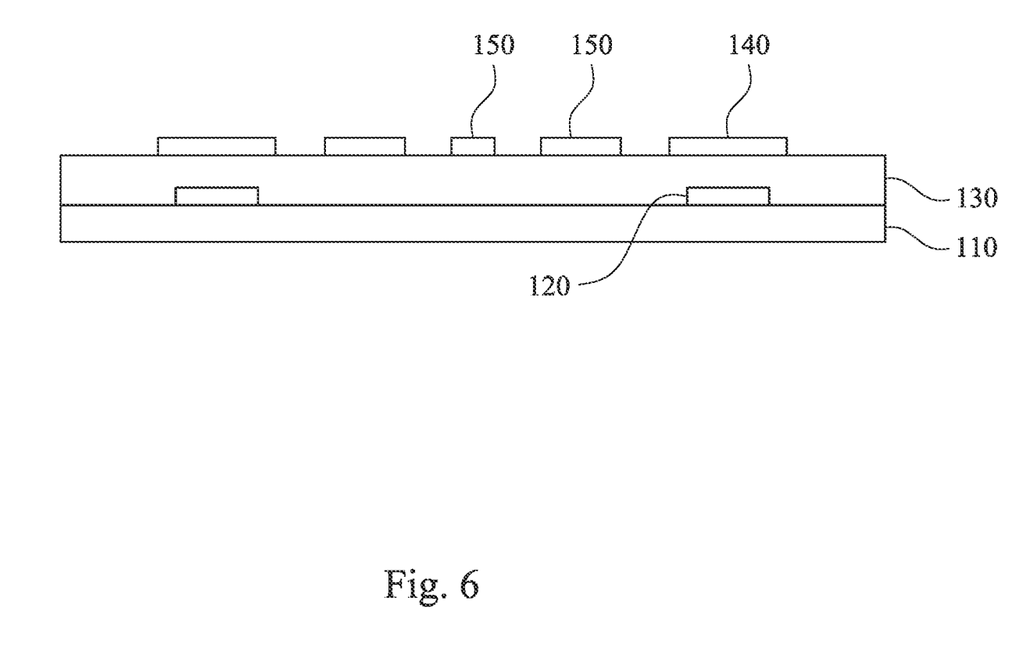
Figure 7:
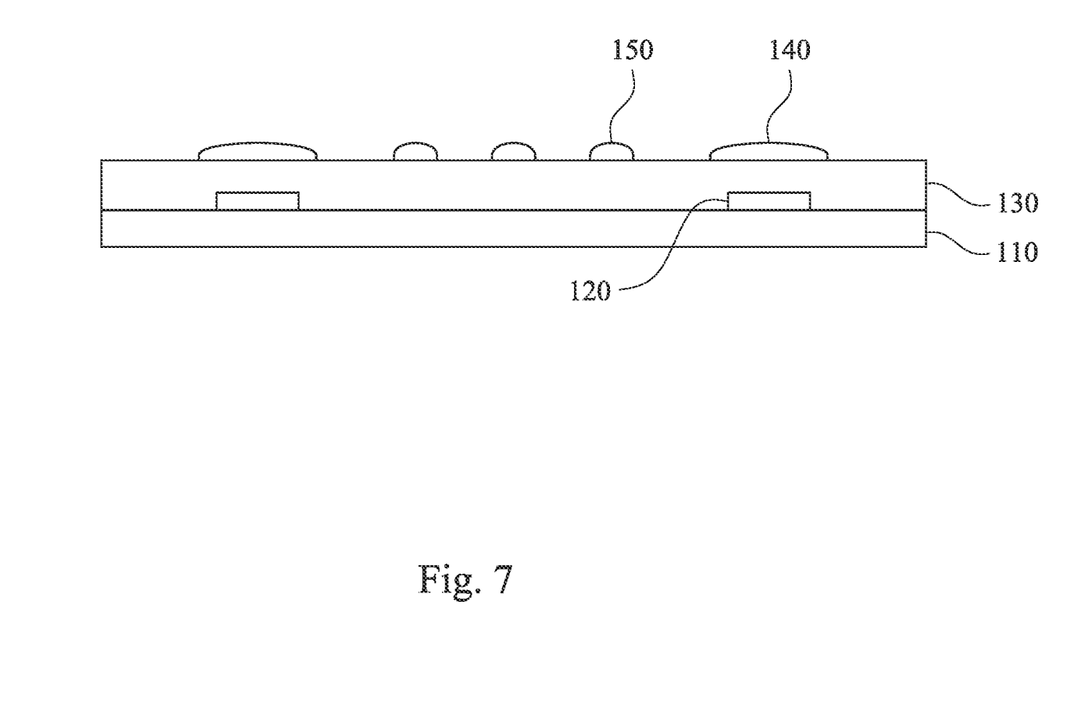

In another example, please refer to FIG. 7, the form of first dot 140 and the form of second dot 150 from the cross-section view show that a center of the dot is higher than two sides of the dot, and a shape of the dot is curved. It should be understood that the location, quantity, and size of the first dots 140 and the second dots 150 shown in FIGS. 5 to 7 are merely exemplary, the quantity and size of the first dots 140 and the second dots 150 may be selected depending on the needed.

Figure 8:
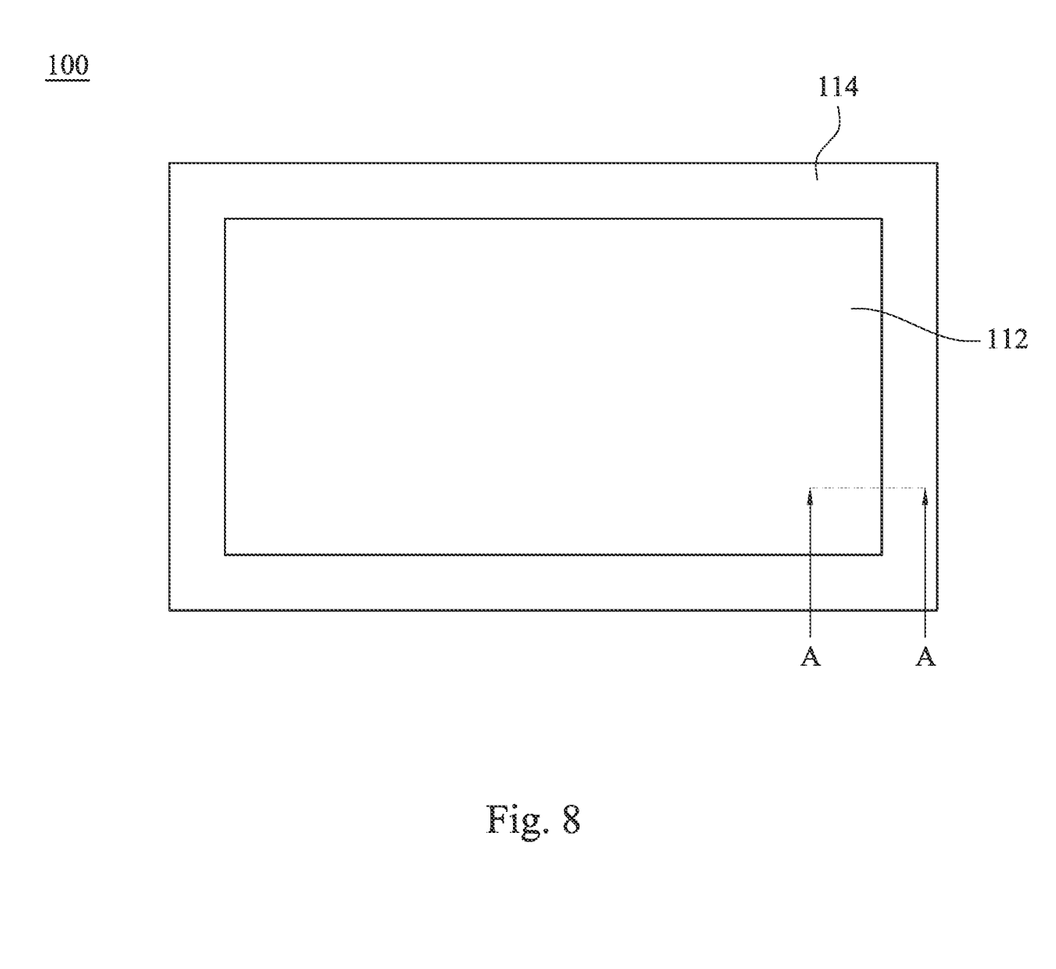
FIG. 8 is a top view of a display area and a peripheral area of a substrate according to one embodiment of the present disclosure.
Figure 9:
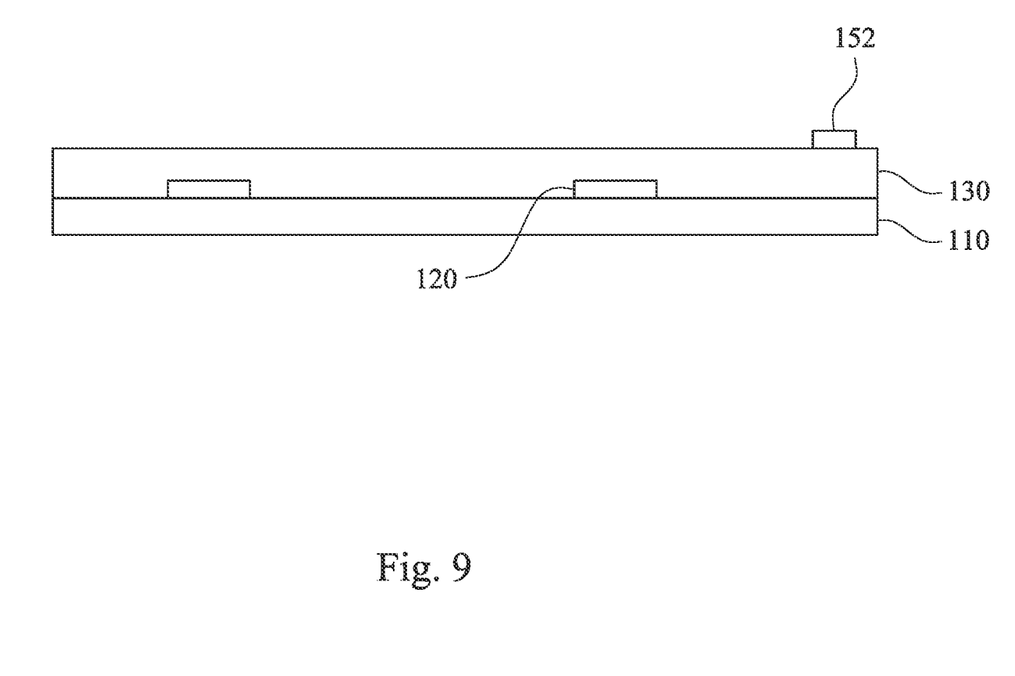
FIGS. 9 and 10 are cross-sectional views of each process stage of preparing dots on the protective layer according to FIG. 8 line A-A.
Figure 10:
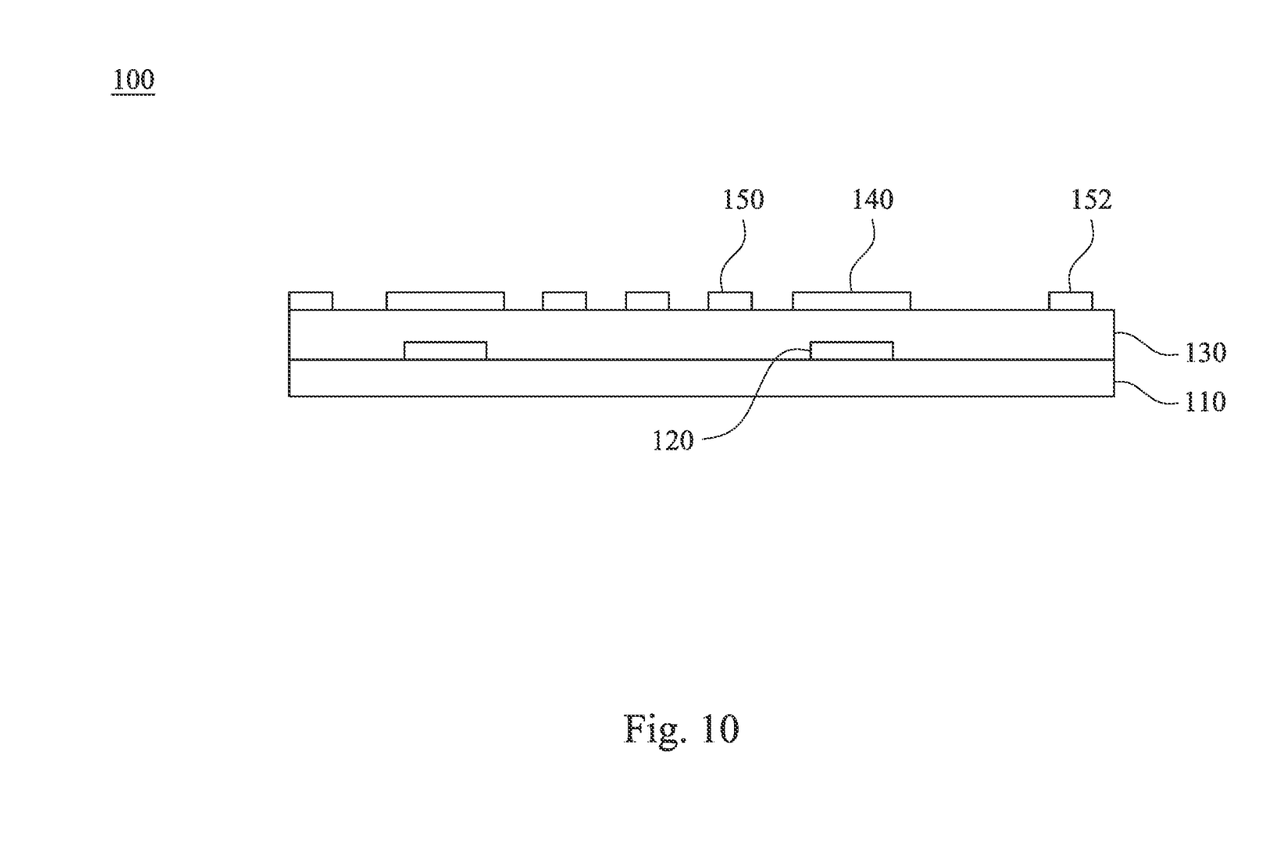

Please refer to FIGS. 8 to 10, FIG. 8 is a top view of a display area 112 and a peripheral area 114 of the substrate 110 according to one embodiment of the present disclosure. For simplicity of drawing, the specific feature of the light-emitting element 120, the first dot 140, and the second dot 150 in FIG. 7 are omitted. FIGS. 9 and 10 are cross-sectional views of each process stage of preparing dots on the protective layer 130 according to FIG. 8 line A-A. The substrate 110 is defined the display area 112 and the peripheral area 114 surrounding the display area 112. In order to solve the situation that when the light source color emitted from the light-emitting element 120 is blue so the surroundings of the light-emitting screen are blue, the backlight module 100 of another embodiment of the present disclosure further includes a plurality of third dots 152 located in the peripheral area 114, and the third dots 152 are yellow to prevent the peripheral area 114 of the screen from being blue. Specifically, besides the material of the second dot 150 in the peripheral area 114 as the same as above mentioned ($SiO_2$, $TiO_2$, $Al_2O_3$, $CaCO_3$, $BaSO_4$ or a combination thereof), the second dot 150 is further doped with 1% to 10% yellow phosphor. In some examples, a vertical projection area of the third dot 152 and a vertical projection area of the light-emitting element 120 are not overlap. In some examples, in the top view of FIG. 8, a ratio of a length of the peripheral area 114 to a length of the display area 112 and the length of the peripheral area 114 is from about 1% to about 4.5%.

Please refer to FIG. 9, the grid frame X for printing dots was positioned on the light board (having the substrate 110, the light-emitting elements 120, and the protective layer 130) (similar to that shown in FIG. 2), the third dots 152 located in the peripheral area 114 was printed on the protective layer 130 by aligning the light-emitting elements 120 through the through hole Y. Please refer to the FIG. 10, next, the first dots 140 and second dots 150 in the display area 112 were printed on the protective layer 130, in which the first dots 140 covered the light-emitting elements 120. When the color of the light source emitted from the light-emitting elements 120 is blue, the peripheral area 114 of the screen being blue was prevented by the third dots 152 with yellow fluorescent powder located in the peripheral area 114.

Please refer back to the FIG. 1, the backlight module 100 according to another embodiment of the present disclosure further includes a blue light transmit film 160, a color conversion film 162, a diffuser plate 164, and an optical brightener film 166. In some examples, when the color of the light source emitted from the light-emitting elements 120 is blue, the blue light transmit film 160 is disposed on the protective layer 130 and the first dots 140 and/or the second dots 150, the color conversion film 162 is disposed on the blue light transmit film 160. The blue light is converted into a uniform white light by the color conversion film 160 and the blue light transmit film 162. In some examples, the color conversion film 162 includes, but is not limited to quantum dot (QD), inorganic phosphor, organic phosphor or a combination thereof. In some examples, the diffuser plate 164 is disposed on the color conversion film 162 to make the light source more uniform; the optical brightener film 166 is disposed on the diffuser plate 164 to make the light source brighter and uniform.

In some embodiments of the present disclosure, the dots directly printing on the protective layer of the light board can reduce the thickness by omitting the diffuser plate as the printing substrate. In addition, the alignment of the dots and the light-emitting elements is completed directly during the printing process, and the alignment and inspection processes in the subsequent assembly can be omitted.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
a substrate defined a display area and a peripheral area surrounding the display area;
a plurality of light-emitting elements disposed on the substrate, and the plurality of light-emitting elements being blue light emission diodes;
a protective layer disposed on the substrate and the plurality of light-emitting elements, and the protective layer having an upper surface and a lower surface opposite to the upper surface, wherein the upper surface is a flat surface;
a plurality of first dots disposed on the upper surface of the protective layer and respectively covering the plurality of light-emitting elements, wherein a vertical projection area of each one of the first dots on the protective layer is larger than a vertical projection area of each one of the light-emitting elements on the substrate;
a plurality of second dots disposed on the protective layer, wherein a size of each one of the second dots is smaller than that of each one of the first dots; and
a plurality of third dots located at the display area, wherein a material of each one of the plurality of third dots is white reflective material doped with yellow phosphor.

2. The backlight module of claim 1, wherein the plurality of light-emitting elements are light emission diodes formed on a wafer, and the plurality of light-emitting elements are implanted on the substrate through mass transfer.

3. The backlight module of claim 1, wherein the plurality of light-emitting elements are blue light emission diodes.

4. The backlight module of claim 1, wherein each of the plurality of light-emitting elements is a Mini LED chip directly packaged on the substrate to form a light board structure, which belongs to a direct-type backlight module.

5. The backlight module of claim 1, wherein a color of each one of the plurality of first dots is white.

6. The backlight module of claim 1, wherein between adjacent two of the first dots, the plurality of second dots are arranged from large to small along a direction away from each one of the adjacent two of the plurality of first dots.

7. The backlight module of claim 1, wherein a size of each one of the plurality of second dots is the same.

8. The backlight module of claim 7, wherein the plurality of second dots are arranged at equal distances between adjacent two of the plurality of first dots.

9. The backlight module of claim 1, wherein a color of each one of the plurality of second dots is white.

10. The backlight module of claim 1, wherein a form of each one of the first dots and a form of each one of the second dots in a cross-section view show that a center of each one of the first and second dots is higher than two sides of each one of the first and second dots, and a shape of each one of the first and second dots is curved.

11. The backlight module of claim 1, wherein a ratio of a length of the peripheral area to a length of the display area and the length of the peripheral area is from 1% to 4.5%.

12. The backlight module of claim 1, further comprising:
a blue light transmit film disposed on the protective layer and the plurality of first dots; and
a color conversion film disposed on the blue light transmit film.

13. The backlight module of claim 12, further comprising:
a diffuser plate disposed on the color conversion film; and
an optical brightener film disposed on the diffuser plate.

14. The backlight module of claim 1, wherein the protective layer is a transparent gel.

15. The backlight module of claim 1, wherein the upper surface of the protective layer is a reflection surface, refraction surface, or a combination thereof.

16. The backlight module of claim 1, wherein a thickness from each one of the plurality of light-emitting elements to the upper surface of the protective layer is from 100 μm to 400 μm.

17. A display device, comprising:
a backlight module comprising:
a substrate defined a display area and a peripheral area surrounding the display area;
a plurality of light-emitting elements disposed on the substrate, and the plurality of light-emitting elements being blue light emission diodes;
a protective layer disposed on the substrate and the plurality of light-emitting elements, and the protective layer having an upper surface and a lower surface opposite to the upper surface, wherein the upper surface is a flat surface; and
a plurality of first dots disposed on the upper surface of the protective layer and respectively covering the plurality of light-emitting elements, wherein a vertical projection area of each one of the first dots on the protective layer is larger than a vertical projection area of each one of the light-emitting elements on the substrate;
a display panel disposed on the backlight module;
a frame body, the backlight module and the display panel disposed in the frame body; and
a plurality of second dots disposed on the protective layer, wherein a size of each one of the second dots is smaller than that of each one of the first dots; and
a plurality of third dots located at the display area, wherein a material of each one of the plurality of third dots is white reflective material doped with yellow phosphor.

18. The display device of claim 17, wherein the frame body has a plastic frame, and the display panel is disposed on the plastic frame.

* * * * *